UNITED STATES PATENT OFFICE.

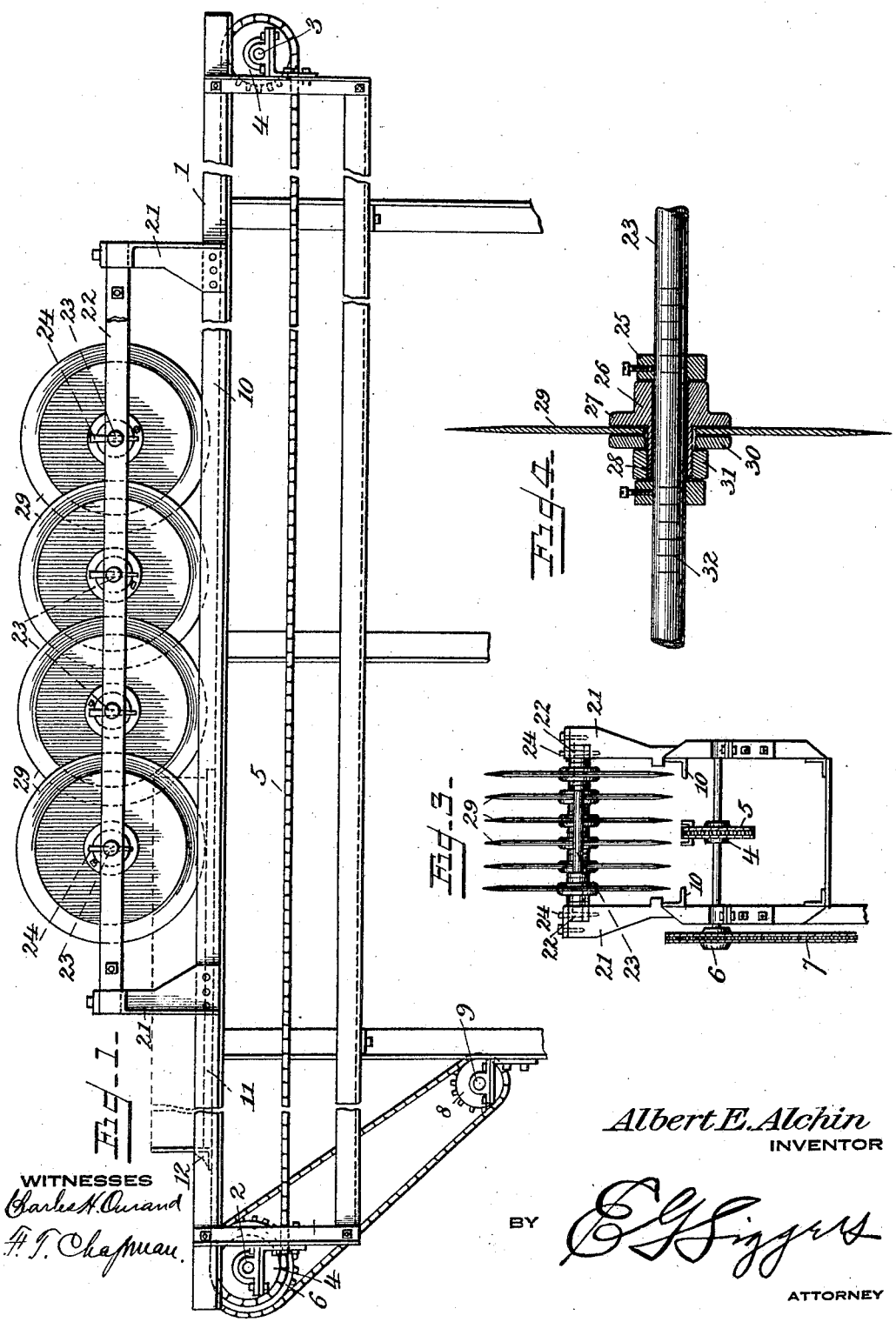

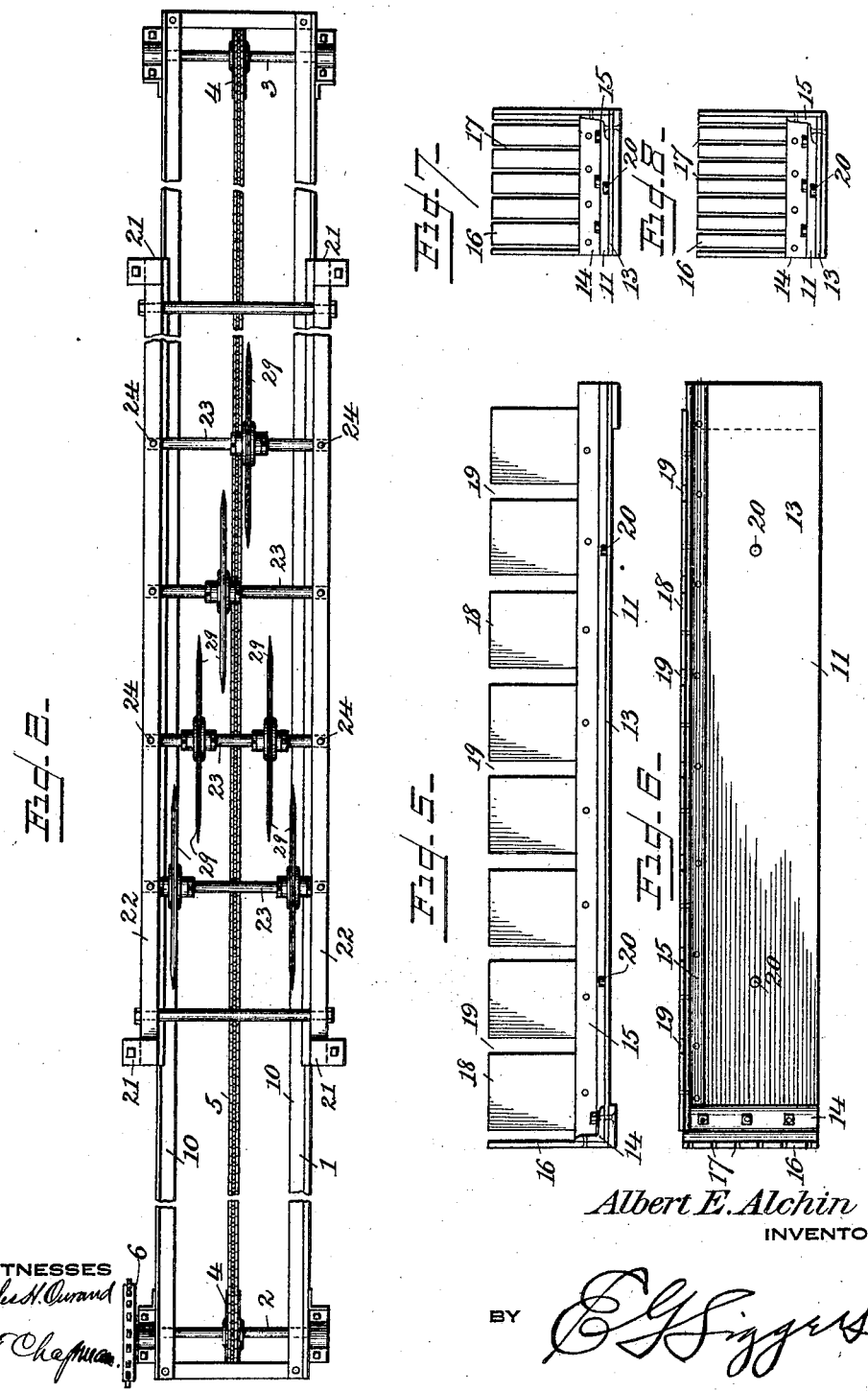

ALBERT ERNEST ALCHIN, OF PERTH AMBOY, NEW JERSEY.

MACHINE FOR CUTTING BLOCKS INTO SMALLER SIZES.

1,397,198.  Specification of Letters Patent.  Patented Nov. 15, 1921.

Application filed December 30, 1919. Serial No. 348,402.

*To all whom it may concern:*

Be it known that I, ALBERT E. ALCHIN, a subject of the King of England, residing at Perth Amboy, in the county of Middlesex and State of New Jersey, have invented a new and useful Machine for Cutting Blocks into Smaller Sizes, of which the following is a specification.

This invention has reference to machines for cutting blocks into smaller sizes, especially where the blocks are composed of ice cream, cake or other similar materials.

The invention has reference to machines of the character shown and described in my Patent No. 1,330,154, dated Feb. 10, 1920, for a machine for cutting blocks of ice cream into bricks. In the machine of said patent the ice cream blocks are caused to travel along a path in which are secured cutting blades in echelon order and so arranged that cuts are made through the blocks, first adjacent to the outer edges and then progressively nearer the longitudinal center line of travel of the block. In this way, the block is cut up into slabs without crowding and then cuts are made through the slabs in directions perpendicular to the first cuts, thus ultimately dividing the block into smaller blocks known as "bricks" in the ice cream trade.

The ice cream, cake or other commodity is furnished in relatively large blocks of appropriate size to be cut into bricks or the like. Such blocks are each placed upon a carrier caused to travel by appropriate mechanism along a path in which the cutters are placed, and in accordance with the present invention, such cutters are in the form of disks capable of free independent rotation. Furthermore, the disks, which are quite thin, have sharp cutting edges and the arrangement is such that the disks are engaged by the blocks to be cut at a level less than half the diameter of the disks so that the motion of the block causes the disks to rotate and continually present fresh cutting edges to the block in shearing relation thereto.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a side elevation of a machine embodying the invention.

Fig. 2 is a plan view thereof.

Fig. 3 is an end elevation of the machine as viewed from the left-hand end of Fig. 1.

Fig. 4 is a detail section of one of the knives or cutting disks, showing some parts in elevation and drawn on a larger scale than the other views.

Fig. 5 is a side elevation of one of the carriers for a board supporting a block of ice cream or other commodity.

Fig. 6 is a plan view of the structure shown in Fig. 5.

Fig. 7 is an elevation of the right-hand end of the structure shown in Figs. 5 and 6.

Fig. 8 is a view similar to Fig. 7 but arranged for producing a greater number of cuts than provided for in the structure of Fig. 5 and associated figures.

Referring to the drawings, there is shown a frame 1 which may constitute the main frame of the machine and may be conveniently made of structural metal. At opposite ends of the frame 1 are shafts 2, 3, respectively, each carrying a sprocket wheel 4, with which sprocket wheels a sprocket chain 5 engages. The shaft 2, at one end, extends through the frame 1 and there carries a sprocket wheel 6 engaged by a sprocket chain 7 in turn receiving power from a sprocket wheel 8 mounted on a drive shaft 9. The sprocket gearing may represent any suitable form of mechanism for driving the chain 5 and may receive power from any suitable source, which however is not shown.

On the inner portions of the sides of the frames 1 are longitudinal L bars 10 in position to support a carrier 11, permitting such carrier to move along the L bars from one end of the machine to the other in engagement with the upper run of the chain 5, which latter may have prongs or projections 12 (Fig. 1) adapted to engage the carrier 11 and move it from one end to the other of the frame 1. The arrangement is such that a carrier with ice cream or other commodity thereon may be placed upon the tracks formed by the L bars 10 and carried by the chain 5 to the other end of the frame 1 or to such position short of such end as will permit an operator to readily lift the carrier or the board with the ice cream thereon from the machine.

The carrier 11 comprises a bottom member 13 of sufficient length and with an end bar 14 and a side bar 15, the other end and side of the carrier being free from bars. At the end of the carrier provided with the bar 14 is an upright plate 16 with slots 17 formed therein and so spaced as to correspond to the width of the slabs into which the block is to be divided. The longitudinal or side bar 15 carries a suitable number of plates 18 spaced apart in the direction of the length of the carrier, or in the form of a single plate but, in either event, openings or slots 19 are provided for the passage of cutters.

The block of ice cream or other commodity is placed upon a board, which latter is not shown, and the board is placed upon the carrier 11 so that the ice cream abuts the inner face of the plate 16 before any cut is made. In order to properly hold and center the board upon which the commodity is placed, a suitable number of pins 20 are provided upon the bottom member 13 for engagement with the board.

Erected on the top beams of the frame 1 are posts 21 carrying longitudinal bars 22, and mounted at the ends in the bars in an appropriate number of shafts 23 extending from one bar to the other, pins 24 serving to hold the shafts 23 in set position, assuming that the shafts are not to rotate.

Set collars 25 are secured to each shaft 23, and between each pair of collars 25 there is mounted a hub 26 with an annular shoulder 27 and axial extension 28. The shoulder 27 serves as an abutment for a cutting blade 29 held against the shoulder 27 by a washer 30 and nut 31, the latter being applied to the extension 28 which is externally threaded to receive the nut. Indications or markings 32 are provided on the shaft 23 to aid in locating the cutter 29 lengthwise of the shaft, each shaft carrying one or more cutters. In the particular showing of the drawings, the cutters 29 are assumed to be freely rotatable with the rotation independent of the shaft 23. Each cutter 29 is in the form of a disk of sheet steel or other suitable material reduced at the peripheral portion to a keen edge. As an example, the disk 29 may be about ten inches in diameter and about one-eighth inch thick up to within about one inch of the periphery and there tapered in thickness to a very sharp edge so that the taper portion has an extent of about one inch radially. The bars 22 are so located with reference to the travel of the board, upon which the ice cream or other material is supported, that the disks will cut entirely through the block, cutting to but not into the board; that is, the disks are so set that they do not touch the board. The board supporting the block of ice cream or other material may be made of wood. The size of the cutting disks with relation to the thickness of the block is so arranged that the disks have a downward cutting travel, and as the block moves against them, the disks rotate. Furthermore, the diameter of the disks relative to the length of the block is such that the disks revolve but once in the travel of the entire block past the disks. This is advantageous in that the knife or cutter does not become chilled in cutting through the block when the latter is ice cream. This avoids liability of the knife or cutter binding or failing to make a clean cut, for as soon as the knife becomes chilled it begins to bind and will no longer make a clean cut.

In the particular arrangement of the drawings, the cutters are arranged in stepped or echelon order with each blade overlapping the blade immediately forward of it. Those blades or cutters which are first engaged by the block are wide apart and cut slabs from opposite sides of the block with the major portion of the block between them. The following blades or cutters are arranged in pairs and also singly to be successively engaged by the block until the final slab is a central slab left from cutting slabs from opposite sides thereof. The cutters are disposed in the direction of travel of the blocks being cut so that there is always a material portion of the block left for support for the final cut. Of course, other arrangements of the cutters may be employed; that is, the cutters and the block of material to be cut may be so proportioned that a less number than six cutters is used, or a greater number of cutters than six may be used, as in Fig. 8, where provision is made for the employment of eight cutters, which may be taken by way of example.

When the block of ice cream or other material has been severed into slabs, the carrier may be transferred to another similar machine in which the cutters are placed at right angles to the arrangement shown in Figs. 1, 2 and 3, and the carrier may be caused to travel in the appropriate direction to sever the slabs into smaller pieces, which in the case of ice cream will be of brick size and in the case of other materials will be of appropriate size.

What is claimed is:

1. A machine for cutting ice cream blocks and other frozen products, including one or more flat freely rotatable disk knives or cutters, each cutter having a circumference equal to or greater than the length of the blocks to be cut, whereby each individual cutter revolves not more than once as it progresses through the block so that no part of a cutter is unduly chilled by coming in contact with the same block twice in making a single cut.

2. A machine for the purpose described comprising a traveling carrier for a block of material to be cut, a series of flat freely rotatable disk knives or cutters, with the diameter of each cutter sufficiently greater than the thickness of the block to be cut to cause the cutter to rotate and travel through the block with a slanting downward movement, the cutters being arranged with each cutter overlapping the cutter next in advance thereof, and the cutters being so grouped with relation to the size of the block, as to cause the cutters to revolve but once in traveling through the block.

3. A machine for the purpose described provided with a traveling carrier for a block of the material to be cut, and a series of disk cutters mounted to freely rotate and held against bodily progressive movement in the machine, the cutters being displaced sidewise with relation to each other by distances equal to the separation of the cuts and each cutter overlapping the next cutter in advance.

4. A machine for the purpose described provided with a traveling carrier for a block of the material to be cut, and a series of disk cutters mounted to freely rotate and held against bodily progressive movement in the machine, the cutters being displaced sidewise with relation to each other by distances equal to the separation of the cuts and each cutter overlapping the next cutter in advance, the cutters first engaged by the block having the greatest spread and the other cutters progressively approaching laterally of the path of travel of the block.

5. A machine for cutting blocks of material into smaller sizes comprising a series of laterally and longitudinally displaced overlapping rotary cutters held against bodily movement in the direction of the length of cut and with the overlapping of the cutters sufficient to cause two adjacent overlapping cutters to be engaging the block substantially simultaneously.

6. In a machine for cutting blocks of material into smaller sizes, a series of disk cutters mounted to freely rotate without bodily progression with each cutter overlapping and laterally displaced from the next cutter in advance, and means for propelling a block of the material to be cut along the cutters to be severed by the latter into longitudinal slabs.

7. A machine for severing blocks of ice cream or other material into smaller blocks, provided with a traveling carrier for the block of material, and a series of laterally displaced overlapping disk cutters mounted to freely rotate about their own axes and held against bodily progressive movement in the machine, the disk cutters being located and of a diameter to cut through the block with the cutting edge presented in shear-cut relation to said block.

8. A machine for cutting blocks of ice cream or other material into smaller sizes comprising a traveling carrier with means for receiving and supporting a board on which the block of material is placed, and a series of disk cutters mounted above and extending into the path of travel of a block on the carrier, the axes of rotation of the cutters being held against progressive movement in the machine and the cutters being freely rotatable about their axes of rotation with the cutters overlapping lengthwise of the machine and located in the path of the block to cut substantially through the block to the board.

9. A machine for severing blocks of ice cream or other material into smaller sizes comprising a suitable frame, a carrier for the block movable lengthwise of the frame, propelling means on the frame for the carrier, a series of shafts supported by the frame at an equal distance above the path of travel of the carrier and spaced apart longitudinally of the machine, and disk cutters on the shafts each free to rotate about its shaft and held thereby against bodily progressive movement in the machine, some of the shafts carrying more than one disk cutter, and all the cutters being of a diameter relative to the length of the block whereby the cutters rotate not more than once to sever the blocks passed beneath them in the direction of the length of the travel of the carrier.

10. A machine for severing blocks of ice cream or other materials into smaller sizes, comprising a suitable frame, longitudinally disposed tracks on the frame, a carrier for the block mounted on the tracks to move lengthwise of the frame, propelling means on the frame for the carrier, a series of shafts supported by the frame above the path of travel of the carrier, and disk cutters on the shafts each free to rotate about its own axis and held by the shaft against bodily progressive movement of the machine, the shafts overlying the path of the carrier and at a height above the path of the carrier to cause the cutters to sever a block passed beneath them into smaller pieces in the direction of the length of travel of the carrier, the cutters approaching from one end of the machine toward the other in the direction of travel of the block and also overlapping and of a diameter with reference to the thickness of the block to cause adjacent edges of the cutters to be leaving and entering the top of the block at substantially the same time on a line transverse of the line of travel of the block.

11. In a machine for severing blocks of ice cream or other material into smaller sizes, a fixed shaft, a disk cutter, a hub on which the cutter is mounted and which in turn is mounted on the shaft, clamping means for holding the cutter on the hub, and set collars adapted to the shaft for holding the hub in adjusted positions along the shaft, the disk cutter revolving with its hub between the set collars with the shaft as an axis.

In testimony that I claim the foregoing as my own, I have hereto affixed my signature in the presence of two witnesses.

ALBERT ERNEST ALCHIN.

Witnesses:
 FRED H. WALKER,
 PORTER D. DECKER.